United States Patent [19]

Senecal

[11] 3,755,655

[45] Aug. 28, 1973

[54] MACHINE PROCESSED DATA CARD

[75] Inventor: Eugene G. Senecal, Windsor, Conn.

[73] Assignee: TAC Industries, Inc., New York, N.Y.

[22] Filed: Oct. 26, 1971

[21] Appl. No.: 192,372

[52] U.S. Cl. .......... 235/61.12 R

[51] Int. Cl. .......... G06k 19/06

[58] Field of Search .......... 235/61.12 R, 61.12 N, 235/61.12 C, 61.12 M

[56] References Cited

UNITED STATES PATENTS

| | | | |
|---|---|---|---|
| 3,015,424 | 1/1962 | Laframboise | 235/61.12 R |
| 3,114,036 | 12/1963 | Andregg | 235/61.12 R |
| 885,826 | 4/1908 | Anderson | 235/61.12 R |
| 2,709,001 | 5/1955 | Stahl | 235/61.12 R |
| 3,015,438 | 1/1962 | Knight | 235/61.12 R |

*Primary Examiner*—Daryl W. Cook
*Attorney*—John C. Linderman

[57] ABSTRACT

A machine processed data card is provided with a manually removable section which when removed creates an aperture that can be read by a processing machine. The removable section may be connected to a peripheral pull tab and both the section and the tab are joined to the rest of the card along lines of weakening so that a person not having the normal facilities for imposing information on the data card can remove the tab and section manually to either create new data or to indicate that the data should be changed.

3 Claims, 3 Drawing Figures

MACHINE PROCESSED DATA CARD

BACKGROUND OF THE INVENTION

This invention relates to machine processed data cards of the type which are capable of being read by mechanical or optical processing equipment.

The use of business machines which derive information from or utilize prepunched data cards is already well known and has received wide acceptance in many fields of government, business and trade. Such cards assembled in a deck can be employed as a storage device in a computer memory or the cards themselves may be produced by the machine as, for example, money orders, checks, application forms, address cards or other documents which are handled in large quantities and require subsequent processing.

Frequently the information on the data cards is defined by apertures which permit the card to be examined or "read" by mechanical or optical means. The apertures are located in a specific data region on the card and the presence or absence of an aperture at any particular location may by itself or in conjunction with other apertures on the card provide certain information which is understood by the processing equipment. To increase the amount of data which can be contained by any given card, the apertures are generally small and are provided at specific locations on the cards. The sizes and shapes of th apertures must be accurately controlled in order to avoid introducing errors in the data. Because of the accuracy required in locating the apertures in the card, special recording or punching equipment is employed and due to the sophistication of such equipment, it is not readily available to many of the intended users of the cards. Therefore, where a card is provided with space for a user to indicate new information or a change in information, such as a change in his address, all such cards, even though prepared for machine processing, must be inspected by hand since the automatic processing machines are usually only capable of reading information provided by the punched apertures. Since the automatic processing systems using punched data cards are normally used where a large number of cards are processed, the manual inspecting procedure to determine, for example, whether there is a change in address can be very time consuming. It is desirable that a data card be provided that permits a user not having the normal sophisticated punching equipment to modify the cards so that a processing machine can at least isolate from other cards in a deck those cards on which new or changed information has been recorded in the more conventional written or typed form which is not intelligible to the conventional processing equipment.

It is accordingly a general object of the present invention to provide a machine processed data card on which the data can be manually inserted or changed by a user without having sophisticated punching or recording equipment and in a manner which is intelligible to the conventional processing equipment.

SUMMARY OF THE INVENTION

The present invention resides in a machine processed data card having a data region in which information is recorded by means of machine readable characters, such as transparent windows which can be optically read or apertures which can be either optically or mechanically read. The data card has a manually removable section in the data region and the removable section conforms to the shape of the machine readable characters. Since the readable characters are generally small, a peripheral pull tab is connected to the removable section so that a person can readily remove the section without difficulty. With the section removed, the data card can be fed into conventional processing equipment and the equipment, recognizing that the section has been removed, can be programmed to set the card aside for special processing if needed. In this manner, manual inspection of all such cards for new or changed information can be eliminated.

DESCRIPTION OF THE PREFERRED EMBODIMENT

Figure 1:
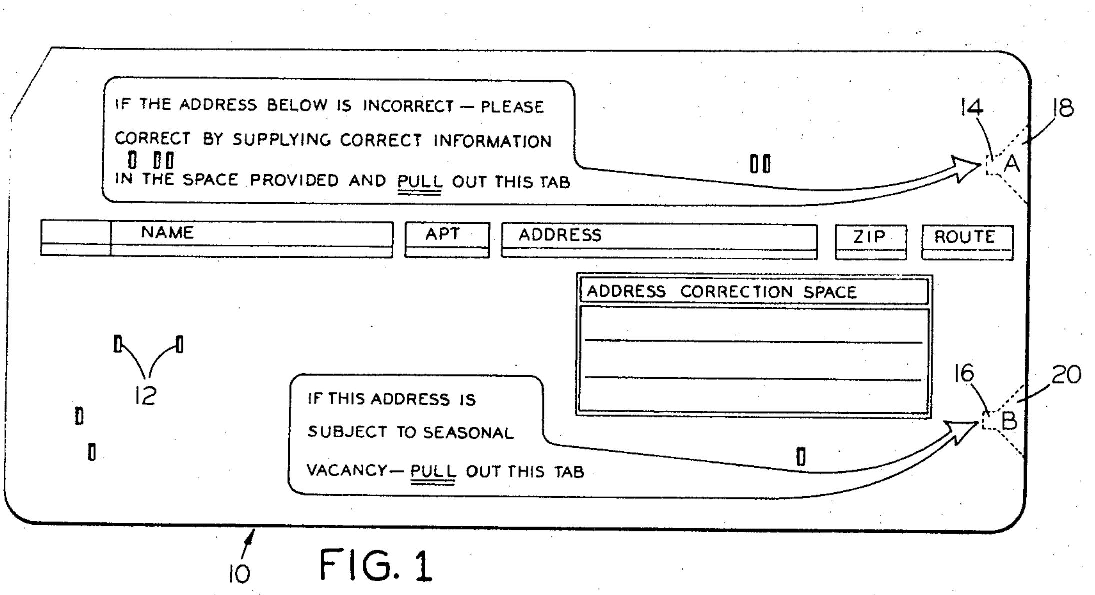
FIG. 1 is a frontal view of a machine processed data card embodying the present invention.

FIG. 1 shows a punched data card, generally designated 10, embodying the present invention. The particular card 10 is shown as an address correction card for convenience; however, it should be understood that the invention is not limited to the particular embodiment of the card shown and can be used for a multitude of purposes where it is desired to manually introduce new information or changed information on a data card.

The card 10 is a conventional data card on which information is imposed in coded form by means of the presence or absence of machine readable data characters shown as apertures 12. The apertures are arranged in specified rows and columns forming a coding matrix in a data region located at a specified position with respect to the top, bottom and lateral edges of the card so that the card can be transported through a card reader in order to determine the information recorded on the card or to further process the card by, for example, locating the card in a memory deck, marking the card, or storing the card for retrieval at a later time.

The apertures 12 which define information in coded form are shown as rectangular apertures having a uniform size and shape. The machine which reads such a card may be provided with one or more sensing elements that are capable of detecting the apertures at the specific locations on the cards 10. For example, the machine may be provided with mechanical pins, optical sensors or pressure sensors which cooperate with each coordinate of the coding matrix as the card is read to detect an aperture. It will therefore be understood that by creating a new aperture on a card manually, a change in data can be indicated.

Figure 2:
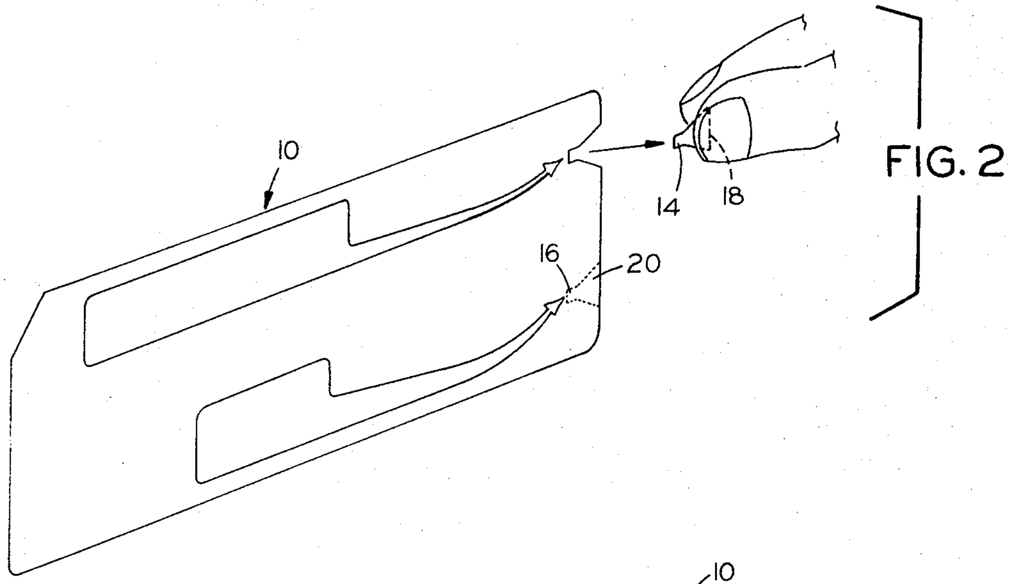
FIG. 2 is a perspective view of the data card in FIG. 1 and shows a section of the card being manually removed.

As shown on the right side of the card 10 as seen in FIGS. 1 and 2, there are provided two manually removable sections 14 and 16 which are connected respectively to pull tabs 18 and 20 extending inwardly from the right hand edge of the card to the data region. The removable sections 14 and 16 have a rectangular configuration corresponding substantially in size and shape to the rectangular apertures 12. The size of the sections is actually slightly larger than an aperture 12 in order to compensate for any fibrous residue retained by the card during the removal process. The tabs 18 and 20 connect to the rectangular sections respectively along one side of the rectangle. The sections 14 and 16 and respective tabs 18 and 20 are joined to the rest of the data card 10 along lines of weakening. The lines of weakening may be formed by perforations or scoring to facilitate the manual separation of the sections from the card.

As clearly seen in FIG. 2, the sections 14 and 16 can be manually removed by simply grasping the tab 18 or 20 and pulling outwardly away from the center of the card. In so doing, a person generates a rectangular aperture in the card at a point previously occupied by the removable section at the inner end of the tab. The rectangular aperture having substantially the same size and shape of an aperture 12 can, therefore, be readily detected by a conventional card reader.

Figure 3:
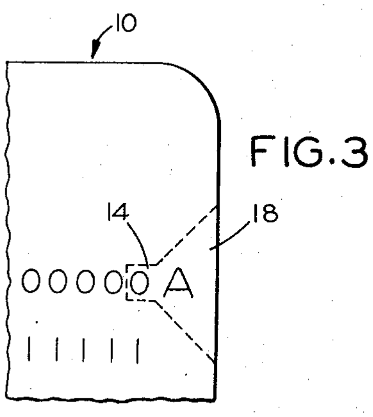
FIG. 3 shows an enlarged portion of the data card with a numerical coding matrix superimposed on the card and indicates how the removable section is utilized to impress a particular coding on the card.

As indicated in FIG. 3, a portion of the card 10 including the removable section 14 is shown with the numerical coding matrix superimposed on the card. The section 14 occupies a position on the card corresponding to the coordinates of the uppermost row, or zero row, and the extreme right hand column in the coding matrix. A machine which would process such a data card would be programmed to recognize the information at these coordinates and select subsequent steps of the process accordingly.

Taking the illustrated change of address card as an example, a person to whom the card is sent may indicate a permanent change of address by removing the section 14 and filling in the new address in accordance with the instructions on the card. When the card is subsequently processed by a conventional machine, the removal of the section is noted and the card is automatically separated from a deck so that the new address information can be recorded.

It is also apparent that the same card can be provided with more than one removable section as shown in FIG. 1 so that more than one bit of information intelligible to a processing machine can be imposed on the card. As shown in FIG. 1, the removal of the section 16 in the data region of the card may indicate that the address is subject to seasonal vacancy.

It will thus be seen that the data card disclosed above can be modified to contain an additional machine readable data character having the same configuration as the machine generated data characters employed to impose data on the card. The modification is performed manually without the aid of any specialized recording equipment and provides a convenient method for data processing centers to receive and isolate data cards requiring special processing with standard processing equipment.

While the data card of the present invention has been defined in a preferred embodiment, it should be understood that other embodiments can be formed without departing from the spirit of the invention. Of course, the tabs connecting with the removable sections may extend to any side of the card and may join with the edge of the removable section closest to the tab. Therefore, the pull tab 18 could extend to the upper side of the card 10 in FIG. 1 rather than the righthand side and section 14 and tab 18 would join along the shorter edge of the rectangle. Accordingly, the present invention is described in a preferred embodiment merely by way of illustration rather than limitation.

I claim:

1. A machine processed data card having a data region in which information is recorded at specific stations in a coding matrix by the presence or absence of a machine readable character of predetermined size comprising: a removable card section having substantially the same size as a machine readable character and in the data region of the card at one of the specified stations in the coding matrix, the removable section having one side part defined by lines of weakening and another side part without lines of weakening; and a manual pull tab extending from the removable section in the coding matrix to the periphery of the data card, the tab being joined to the removable section along the side part without lines of weakening and having lines of weakening extending from the periphery of the data card to the side part defined by lines of weakening.

2. A machine processed data card as defined in claim 1 wherein the removable section has a rectangular shape defined by lines of weakening along three sides, the fourth side being without a line of weakening; and the pull tab is joined to the removable section along substantially the entire length of the fourth side.

3. A machine processed data card as defined in claim 2 wherein the dimension of the pull tab at the peripheral edge of the data card is larger than the fourth side of the rectangularly shape removable section.

* * * * *